(12) United States Patent
Suzuki et al.

(10) Patent No.: US 11,514,283 B2
(45) Date of Patent: Nov. 29, 2022

(54) IMAGE FORMING SYSTEM

(71) Applicant: CANON KABUSHIKI KAISHA, Tokyo (JP)

(72) Inventors: Yohei Suzuki, Shizuoka (JP); Seiji Hara, Shizuoka (JP); Masafumi Monde, Kanagawa (JP); Hiroshi Hagiwara, Shizuoka (JP); Yoshitaka Zaitsu, Chiba (JP); Hiromitsu Kumada, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/159,387

(22) Filed: Jan. 27, 2021

(65) Prior Publication Data
US 2021/0241058 A1 Aug. 5, 2021

(30) Foreign Application Priority Data

Jan. 30, 2020 (JP) .............................. JP2020-013813

(51) Int. Cl.
G06K 15/00 (2006.01)
G03G 15/00 (2006.01)
G06K 15/12 (2006.01)

(52) U.S. Cl.
CPC ....... G06K 15/408 (2013.01); G03G 15/5016 (2013.01); G03G 15/55 (2013.01); G06K 15/002 (2013.01); G06K 15/129 (2013.01)

(58) Field of Classification Search
CPC .. G03G 15/5016; G03G 15/502; G03G 15/55; G03G 15/6502; G03G 21/1633; G03G 2215/0154
See application file for complete search history.

(56) References Cited

U.S. PATENT DOCUMENTS

| 5,357,108 A | 10/1994 | Suzuki et al. |
| 6,130,885 A | 10/2000 | Izumi et al. |
| 6,965,239 B2 | 11/2005 | Yasuda et al. |
| 7,149,442 B2 | 12/2006 | Ushijima et al. |
| 7,212,007 B2 | 5/2007 | Yasuda et al. |

(Continued)

FOREIGN PATENT DOCUMENTS

| JP | 2003186359 A | * | 7/2003 |
| JP | 2004-226482 A | | 8/2004 |

(Continued)

OTHER PUBLICATIONS

Machine Translation of JP 2003-186359. Jul. 2003. (Year: 2003).*
Machine Translation of JP 2019-101276. Jun. 2019. (Year: 2019).*

*Primary Examiner* — Carla J Therrien
(74) *Attorney, Agent, or Firm* — Venable LLP

(57) ABSTRACT

There is provided an image forming system that includes an image forming apparatus including, a first variable mechanism that varies from a first state to a second state or from the second state to the first state when physically operated by a user, a first detection unit configured to detect the variation of a state of the first variable mechanism, and a sound collection unit. The image forming system further includes a generation unit configured to generate, when the variation is detected by the first detection unit, first statistical information regarding at least one sound wave obtained by the sound collection unit in a period based on a timing when the variation is detected.

25 Claims, 11 Drawing Sheets

(56) References Cited

U.S. PATENT DOCUMENTS

| | | |
|---|---|---|
| 7,265,554 B2 | 9/2007 | Ichimura et al. |
| 7,274,193 B2 | 9/2007 | Yasuda et al. |
| 7,382,137 B2 | 6/2008 | Ushijima et al. |
| 7,502,570 B2 | 3/2009 | Nishimura |
| 7,554,331 B2 | 6/2009 | Ichimura et al. |
| 7,576,546 B2 | 8/2009 | Ichimura et al. |
| 7,583,086 B2 | 9/2009 | Yasuda et al. |
| 7,741,851 B2 | 6/2010 | Ushijima et al. |
| 9,505,251 B2 * | 11/2016 | Sasaki .................... B41J 29/38 |
| 9,983,530 B2 | 5/2018 | Namiki et al. |
| 10,120,321 B2 | 11/2018 | Mori et al. |
| 10,412,234 B2 * | 9/2019 | Udaka ................ H04N 1/00076 |
| 10,458,913 B2 | 10/2019 | Namiki et al. |
| 10,684,218 B2 | 6/2020 | Ishimoto et al. |
| 2007/0070456 A1 | 3/2007 | Nishimura |
| 2015/0092212 A1 * | 4/2015 | Imaoka .............. H04N 1/00896 |
| | | 358/1.13 |
| 2019/0187601 A1 * | 6/2019 | Seki ....................... G03G 15/55 |
| 2019/0376891 A1 | 12/2019 | Namiki et al. |
| 2020/0271575 A1 | 8/2020 | Ishimoto et al. |
| 2020/0319584 A1 | 10/2020 | Monde et al. |

FOREIGN PATENT DOCUMENTS

| | | |
|---|---|---|
| JP | 2007-079263 A | 3/2007 |
| JP | 2019-101276 A | 6/2019 |

\* cited by examiner

IMAGE FORMING SYSTEM

BACKGROUND OF THE INVENTION

Field of the Invention

The present disclosure relates to an image forming system.

Description of the Related Art

In recent years, in the market of image forming apparatuses, which are typically laser printers, there are increasing opportunities for companies to exchange, with users, maintenance contracts or pay-as-you-go contracts that charge fees depending on, for example, the number of printed sheets. Under such contract arrangements, it is expected that an apparatus is used over a limit of quality assurance for a main body of the apparatus or exchangeable components (e.g., an upper limit of years of use or an upper limit of the number of printed sheets; also called a life span). The use of an apparatus that has exceeded its life span may cause abnormal sound to be generated during operation of the apparatus. The generated abnormal sound can be a measure for determining the elapse of the life span or evaluating the risks of failures.

Japanese Patent Laid-Open No. 2004-226482 discloses a method of determining a member in which abnormal sound has been generated by comparing the waveform of sound obtained via a microphone inside an apparatus with known waveforms that are normally generated by members involved with an image forming operation (e.g., a motor and a blade).

SUMMARY OF THE INVENTION

However, the risks of abnormalities in an image forming apparatus, such as failures and poor quality, are affected not only by repetition of an image forming operation, but also by how a user performs such physical operations as opening/closing of a cover, insertion/pulling of a tray, and attachment/removal of a unit. Especially, an operation performed with a force that exceeds durability of the apparatus could possibly trigger such abnormalities as breakage of a member, an impaired life span, and a decrease in the quality of a printed image. In the method disclosed by Japanese Patent Laid-Open No. 2004-226482, sound caused by such a user operation is not considered in making a determination.

In view of this, there has been demand for realization of a structure that enables evaluation of the risks of abnormalities in an image forming apparatus based on sound caused by a user operation.

According to an aspect, there is provided an image forming system that includes an image forming apparatus including, a first variable mechanism that varies from a first state to a second state or from the second state to the first state when physically operated by a user, a first detection unit configured to detect the variation of a state of the first variable mechanism, and a sound collection unit. The image forming system further includes a generation unit configured to generate, when the variation is detected by the first detection unit, first statistical information regarding at least one sound wave obtained by the sound collection unit in a period based on a timing when the variation is detected.

Further features of the present invention will become apparent from the following description of exemplary embodiments (with reference to the attached drawings).

DESCRIPTION OF THE EMBODIMENTS

Figure 1:
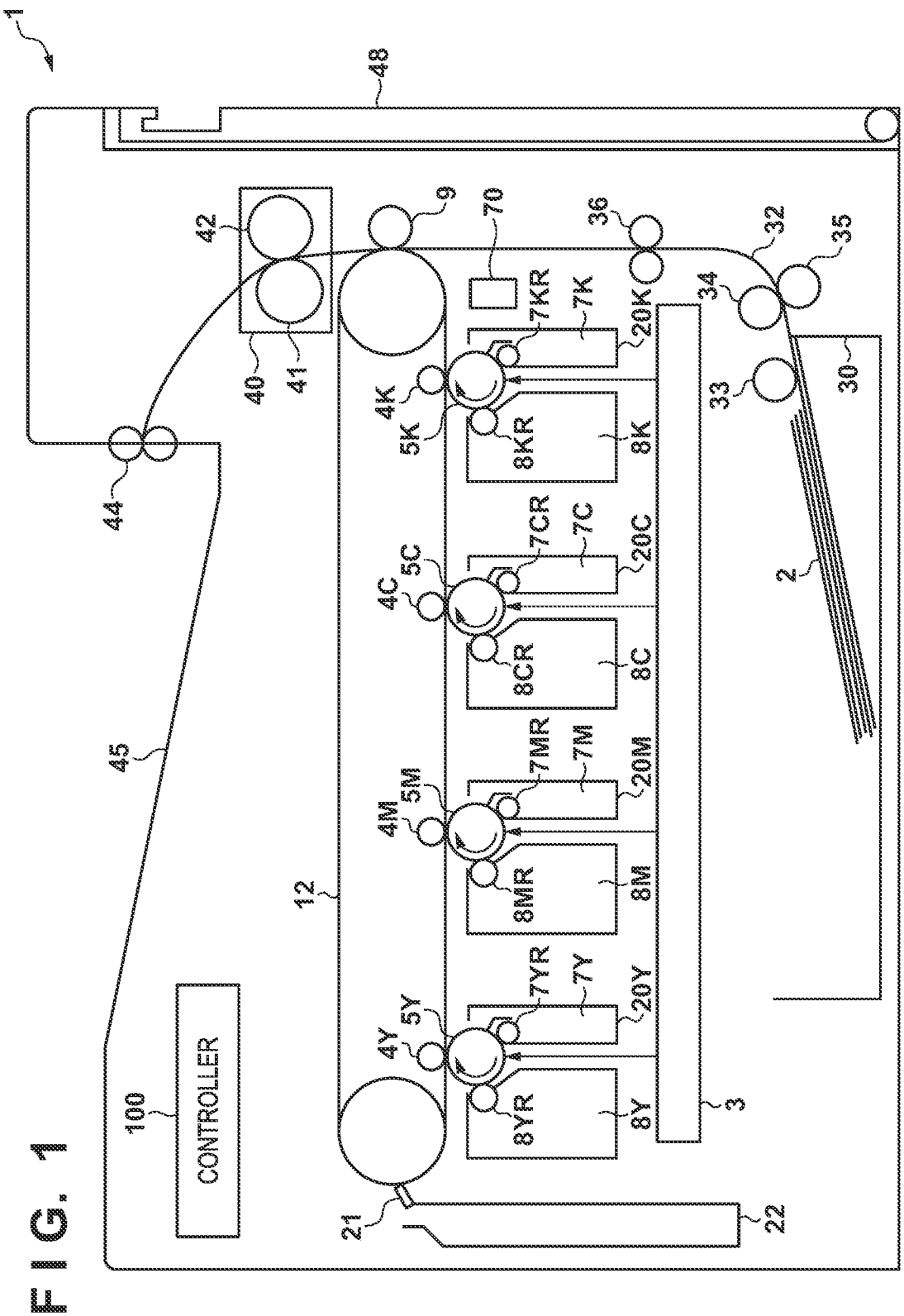
FIG. 1 is a schematic diagram showing a general configuration of an image forming apparatus according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

1. Introduction

In the following, examples in which the technique according to the present disclosure is applied to a printer will be mainly described. Note that the technique according to the present disclosure is also applicable to, for example, other types of image forming apparatuses, such as a copy device and a multi-functional peripheral. Each of the constituent elements described below, such as apparatuses, devices, modules, and chips, may be constituted by a single entity, or may be constituted by a plurality of entities that are physically different from one another, unless specifically stated otherwise.

2. General Configuration of Apparatus

FIG. 1 is a schematic diagram showing a general configuration of an image forming apparatus 1 according to an embodiment. It is assumed here that, as an example, the image forming apparatus 1 is a color laser printer that performs printing in an electrophotographic method using four colors, namely yellow (Y), magenta (M), cyan (C), and black (K).

Referring to FIG. 1, the image forming apparatus 1 includes primary transfer rollers 4Y, 4M, 4C, 4K, photosensitive drums 5Y, 5M, 5C, 5K, charging units 7Y, 7M, 7C, 7K, and development units 8Y, 8M, 8C, 8K for stations of four colors, respectively. The photosensitive drums 5Y, 5M, 5C, 5K, the charging units 7Y, 7M, 7C, 7K, and the development units 8Y, 8M, 8C, 8K are installed in cartridges 20Y, 20M, 20C, 20K, respectively. Note that in the following description, when there is no need to make a distinction among colors, the alphabets at the end of reference signs are omitted; for example, the cartridges 20Y, 20M, 20C, 20K are collectively referred to as cartridges 20. The same goes for reference signs of other constituent elements.

The photosensitive drums (also called image carriers) 5Y, 5M, 5C, 5K are made up of an aluminum cylinder and an organic photoconductive layer applied to the outer circumference of the aluminum cylinder, and rotate in a clockwise direction when a drive force of a drive motor (not shown) is transmitted thereto. The charging units 7Y, 7M, 7C, 7K include charging rollers 7YR, 7MR, 7CR, 7KR, respectively, and the charging rollers 7YR, 7MR, 7CR, 7KR uniformly charge the surfaces of the photosensitive drums 5Y, 5M, 5C, 5K, respectively. Then, an optical unit 3 selectively irradiates the surfaces of the photosensitive drums 5Y, 5M, 5C, 5K with light; as a result, electrostatic latent images are formed on the photosensitive drums 5Y, 5M, 5C, 5K. The development unit 8Y, 8M, 8C, 8K include development rollers 8YR, 8MR, 8CR, 8KR, respectively, and the development rollers 8YR, 8MR, 8CR, 8KR respectively render the electrostatic latent images formed on the photosensitive drums 5Y, 5M, 5C, 5K visible with use of toner, which is one type of a recording agent.

During image formation, an intermediate transfer belt 12 rotates in a counterclockwise direction in the figure while keeping in contact with the photosensitive drums 5Y, 5M, 5C, 5K. A primary transfer bias is applied to the primary transfer rollers 4Y, 4M, 4C, 4K, and the primary transfer bias causes primary transfer of each of the visible images on the photosensitive drums 5Y, 5M, 5C, 5K to the intermediate transfer belt 12. The color visible images transferred to the intermediate transfer belt 12 are secondary-transferred to a recording medium (also called a sheet) 2 at a nip section (a secondary transfer position) between the secondary transfer roller 9 and the intermediate transfer belt 12. The primary transfer rollers 4Y, 4M, 4C, 4K and the secondary transfer roller 9 rotate in accordance with the rotation of the intermediate transfer belt 12.

A part of the visible images remains on the intermediate transfer belt 12 without being transferred to the recording medium 2 at the secondary transfer position. The remaining part of the visible images is removed by a cleaning operation. In the cleaning operation, toner that forms the remaining visible images is conveyed by the intermediate transfer belt 12 to a cleaning blade 21, scraped off by the cleaning blade 21, and collected by a waste toner container 22. Although not shown, each of the cartridges 20 of respective colors can also include a cleaning blade that scrapes off toner remaining on the surface of the photosensitive drum 5, and a waste toner container that collects toner that has been scraped off.

A cassette tray 30 is a container that accommodates a plurality of recording mediums 2 supplied to the image forming apparatus 1. The recording mediums 2 inside the cassette tray 30 are picked up by a pickup roller 33, separated one-by-one by a sheet feed roller 34 and a separation roller 35, and conveyed toward a conveyance roller pair 36 along a conveyance path 32. The conveyance roller pair 36 conveys the incoming conveyed recording medium 2 to the secondary transfer position.

A fixing unit 40 includes a fixing roller 41 that heats a recording medium 2 and a pressurizing roller 42 that brings a recording medium 2 into contact with the fixing roller 41 with pressure, and causes transferred color visible images to be fixed on the recording medium 2 while conveying the recording medium 2. The fixing roller 41 and the pressurizing roller 42 are formed so that they have a hollow shape, and a heater is built inside the fixing roller 41. While the recording medium 2 having the color visible images formed thereon is conveyed by the fixing roller 41 and the pressurizing roller 42, heat and pressure are applied to the recording medium 2; as a result, toner of the visible images is fixed on the surface of the recording medium 2. After the visible images have been fixed, the recording medium 2 is discharged by a sheet discharge roller 44 onto a sheet discharge tray 45.

Figure 2:
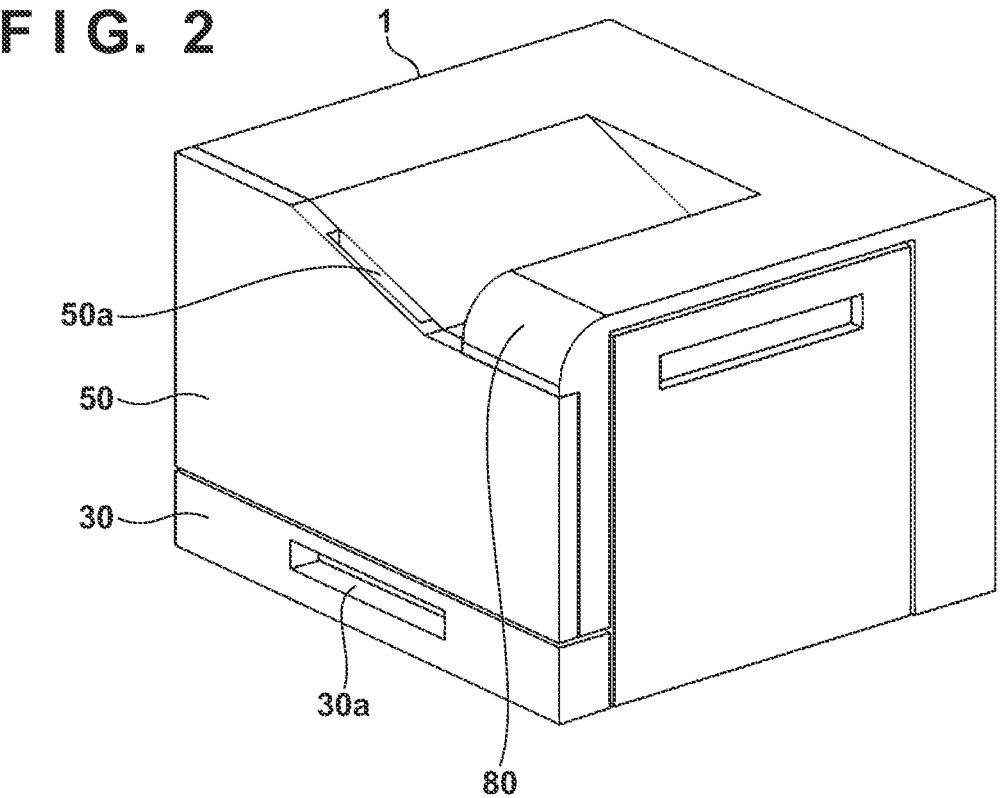
FIG. 2 is a perspective view showing an example of a general external appearance of the image forming apparatus according to an embodiment.

The image forming apparatus 1 includes some cover members for shielding various internal units from the external space. A right cover 48 shown in FIG. 1 is an example of such cover members. A front cover 50, which will be described later using FIG. 2, is another example of such cover members. These cover members are mounted, in an openable and closable manner, on a main body of the image forming apparatus 1. A user can take care of a sheet jam that can occur on the conveyance path 32 by, for example, opening the right cover 48.

A controller 100 is a control unit that controls overall functions of the image forming apparatus 1. The controller 100 is connected to respective components of the image forming apparatus 1 via non-illustrated signal lines. A more specific configuration of the controller 100 will be further described later.

FIG. 2 is a perspective view showing an example of a general external appearance of the image forming apparatus 1. A grip section 30a of the cassette tray 30 is located on the front surface of the image forming apparatus 1. On the front surface of the image forming apparatus 1, the front cover 50 is provided above the cassette tray 30. A grip section 50a of the front cover 50 is located on an upper edge of the front cover 50. A screen 80 is mounted on the upper right of the front surface of the image forming apparatus 1. In the example of FIG. 2, the image forming apparatus 1 is in a state where the cassette tray 30 is inserted completely in the main body, and the front cover 50 is closed.

Figure 3:
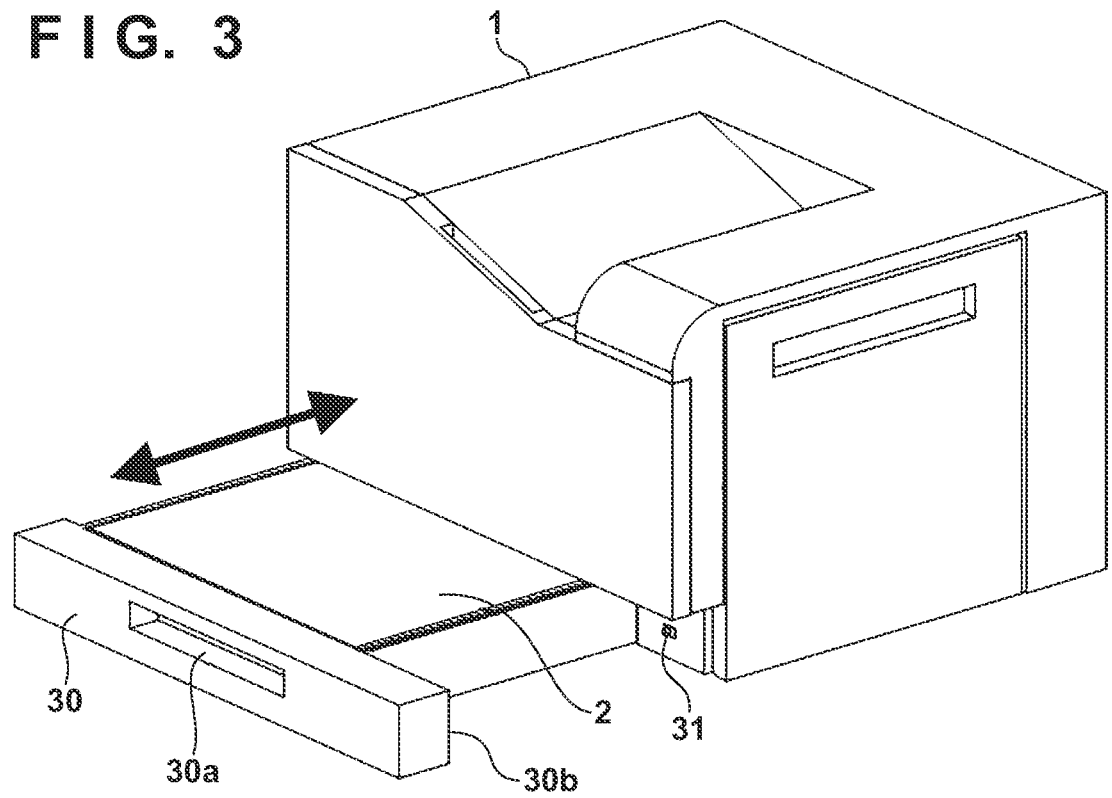
FIG. 3 is a perspective view showing a state where a cassette tray is pulled out from a main body of the image forming apparatus in FIG. 2.

FIG. 3 is a perspective view showing a state where the cassette tray 30 is pulled out from the main body of the image forming apparatus 1. The user supplies recording mediums 2 to the cassette tray 30 in a state where the cassette tray 30 is pulled out. The cassette tray 30 is movable in the directions of an arrow in the figure along, for example, guide rails (not shown) mounted on the main body of the image forming apparatus 1. As the user puts his/her hand on the grip section 30a and pulls the cassette tray 30 forward, the cassette tray 30 varies from a state where it is inserted in the main body of the image forming apparatus 1 to a state where it is pulled out. Furthermore, as the user pushes the cassette tray 30 in the opposite direction, the cassette tray 30 varies from a state where it is pulled out from the main body of the image forming apparatus 1 to a state where it is inserted. FIG. 3 also shows a cassette switch 31 mounted on the main body of the image forming apparatus 1. The cassette switch 31 may be, for example, a pressure sensor. A switch contact surface 30b of the cassette tray 30 presses the cassette switch 31 in a state where the cassette tray 30 is inserted completely in the main body. The cassette switch 31 outputs, to the controller 100, a state detection signal of which voltage is different between a state with the cassette switch 31 pressed by the switch contact surface 30b and a state with the cassette switch 31 not pressed by the switch contact surface 30b.

Figure 4:
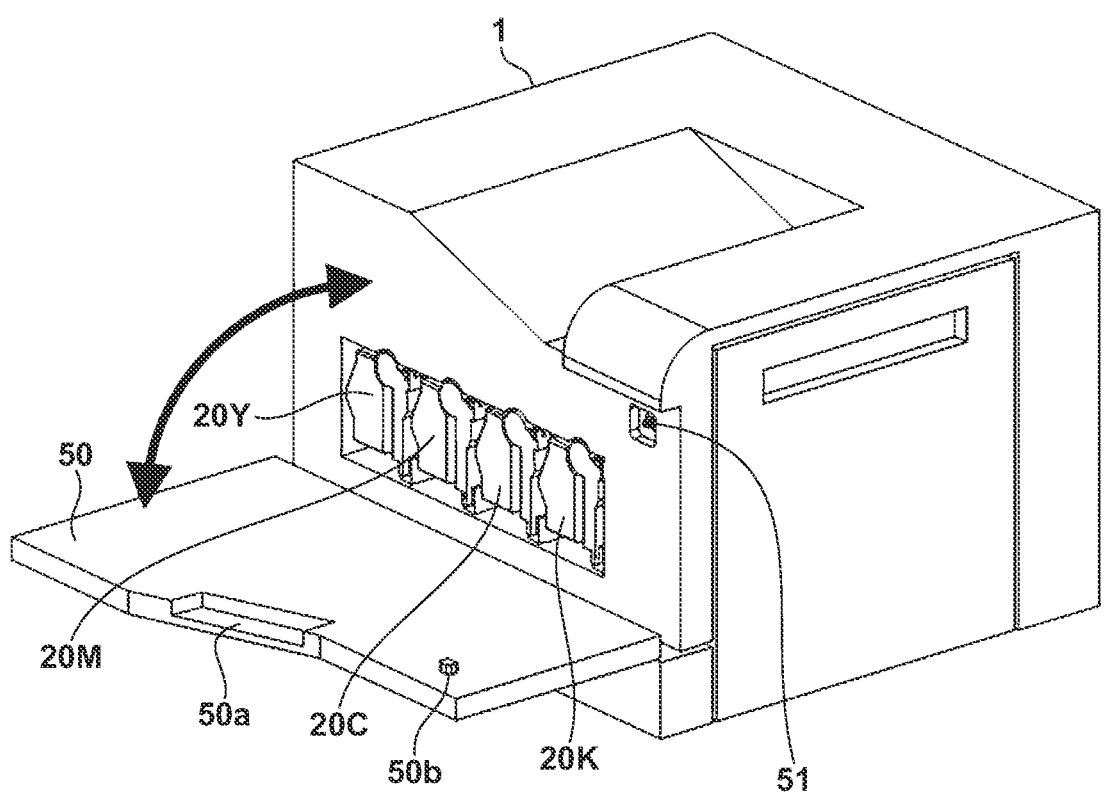
FIG. 4 is a perspective view showing a state where a cover of the image forming apparatus in FIG. 2 is open.

FIG. 4 is a perspective view showing a state where the front cover 50 of the image forming apparatus 1 is open. In a state where the front cover 50 is open in this manner, the cartridges 20Y, 20M, 20C, 20K are exposed to the outside of the main body. This enables the user to remove/attach each cartridge 20 from/to the main body. The front cover 50 is rotatably joined to the main body of the image forming apparatus 1 via, for example, a hinge (not shown) mounted on a lower edge of the front cover 50. This enables the front cover 50 to open and close in the directions of an arrow in the figure, with the hinge serving as a central shaft. As the user puts his/her hand on the grip section 50a and tilts the front cover 50 forward, the front cover 50 varies from a state where it is closed to a state where it is open. Furthermore, as the user raises the upper edge of the open front cover 50 and flips up the front cover 50 in the opposite direction, the front cover 50 varies from a state where it is open to a state where it is closed. FIG. 4 also shows a cover switch 51 mounted on the main body of the image forming apparatus 1. The cover switch 51 may be, for example, a pressure sensor. A protrusion 50b of the front cover 50 presses the cover switch 51 in a state where the front cover 50 is completely closed. The cover switch 51 outputs, to the controller 100, a state detection signal of which voltage is different between a state with the cover switch 51 pressed by the protrusion 50b and a state with the cover switch 51 not pressed by the protrusion 50b.

Although not shown in FIG. 4, other members that are movable (e.g., openable and closable) by the user may be further provided inside the main body of the image forming apparatus 1. The user may be able to remove and attach other components (e.g., the fixing unit 40) of the image forming apparatus 1 by moving these members. A variation in a state due to, for example, opening/closing of these members and attachment/removal of exchangeable components can be detected by a switch and a sensor similar to those described above. Although the foregoing has exemplarily described a pressure sensor as a unit that detects a state of a variable mechanism, a state detection unit is not limited to this example. For instance, a light sensor that responds to light incident in a specific state (blocked in other states) may be used as the state detection unit.

As has been described using FIG. 1 to FIG. 4, the image forming apparatus 1 includes one or more variable mechanisms that vary among a plurality of states when physically operated by a user. How the user performs a physical operation with respect to these variable mechanisms affects the risks of abnormalities in the image forming apparatus 1, such as failures and poor quality. Especially, an operation performed with a force that exceeds durability of the apparatus could possibly trigger such abnormalities as breakage of a member, an impaired life span, and a decrease in the quality of a printed image. In view of this, the embodiments of the present disclosure, which will be described in detail below, incorporate a structure that enables evaluation of the risks of abnormalities in the image forming apparatus 1 based on sound caused by a user operation.

Specifically, as shown in FIG. 1, the image forming apparatus 1 includes a microphone 70 as a sound collection unit. The microphone 70 obtains sound waves in an audible range that are generated inside the image forming apparatus 1, and outputs, to the controller 100, sound level signals that indicate sound wave levels by means of voltages. The microphone 70 is, for example, a MEMS (Micro-Electro Mechanical System) microphone that converts a displacement of a vibration membrane that vibrates due to sound pressure into a voltage variation, and outputs the voltage variation. The MEMS microphone includes, for example, a vibration membrane and a rear electrode which are arranged on a silicon substrate so as to face each other and which form a capacitor. Vibration of this vibration membrane due to sound waves causes a variation in the capacitance of the capacitor of the MEMS microphone. The MEMS microphone amplifies an electrical signal with a voltage that responds to such a variation in the capacitance with use of an amplification circuit, and outputs the resultant electrical signal. Note that the microphone 70 may be another type of microphone that is different from the MEMS microphone; for example, it may be a capacitor microphone. In general, microphones have unique resonant frequencies. Herein, for example, a microphone having a resonant frequency that is not included in a frequency band of sound waves that should be obtained in the image forming apparatus 1 may be used.

3. Configuration Example of Controller

Figure 5:
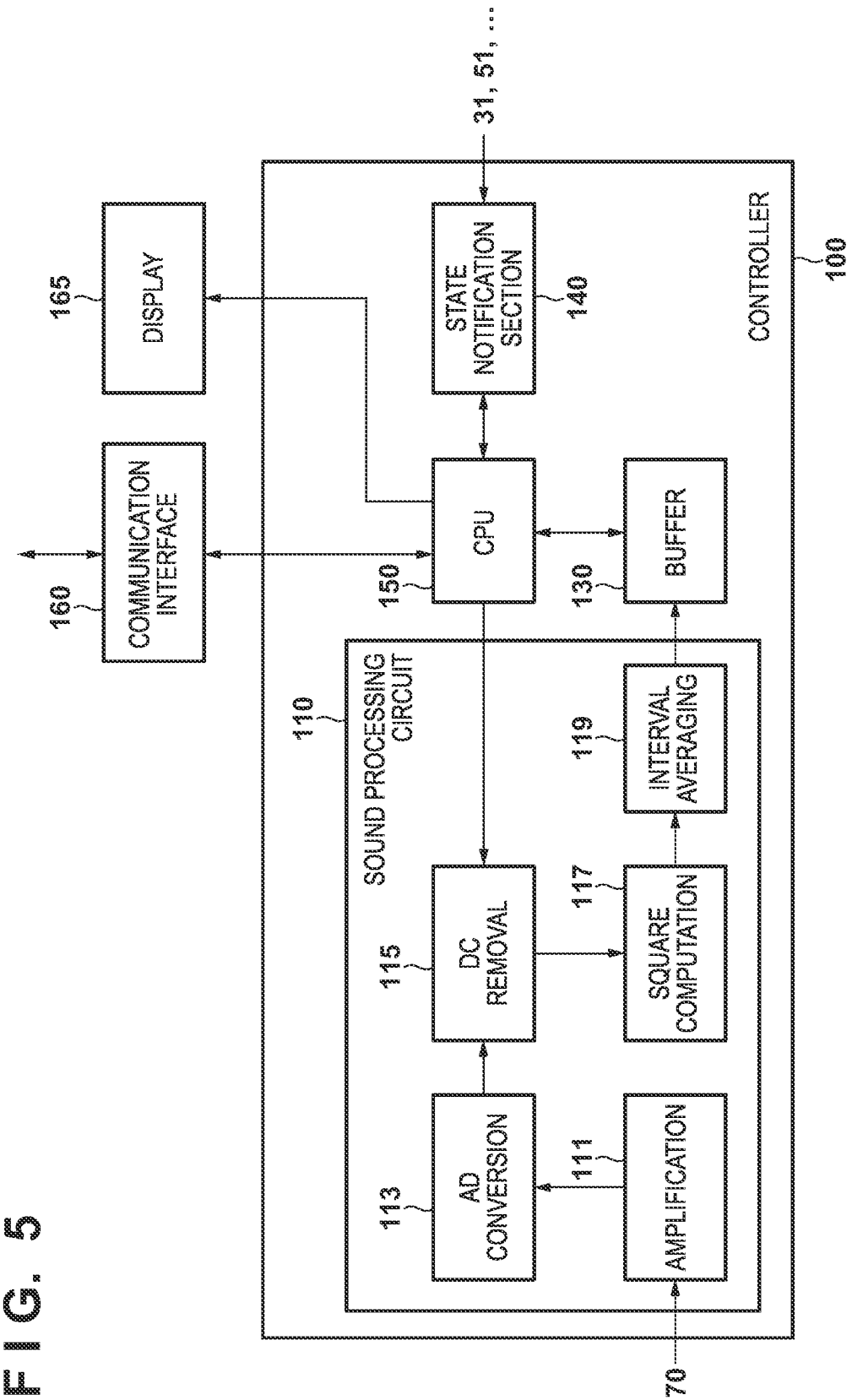
FIG. 5 is a block diagram showing an example of a configuration of a controller of the image forming apparatus according to an embodiment.

FIG. 5 is a block diagram showing an example of a configuration of the controller 100 of the image forming apparatus 1 according to the present embodiment. Referring to FIG. 5, the controller 100 includes a sound processing circuit 110, a buffer 130, a state notification section 140, and a CPU 150. The sound processing circuit 110 includes an amplifier 111, an AD converter 113, a DC removal circuit 115, a square computation circuit 117, and an interval averaging circuit 119. The CPU 150 is connected to a communication interface 160 and a display 165.

As stated earlier, the microphone 70 obtains sound waves in an audible range, including sound waves that are generated when the user physically operates a variable mechanism of the image forming apparatus 1, and outputs sound wave level signals, which are analog signals indicating the levels of the obtained sound waves, to the amplifier 111. The amplifier 111 amplifies the sound wave level signals, and outputs the amplified signals to the AD converter 113. The AD (Analogue-Digital) converter 113 converts the form of the signals input from the amplifier 111 from an analogue form to a digital form, and outputs the sound wave level signals in the digital form to the DC removal circuit 115. The DC (Direct Current) removal circuit 115 converts the sound wave level signals input from the AD converter 113 into signals that only indicate fluctuations in the sound wave levels (sound pressure) by removing DC components, and outputs the converted signals to the square computation circuit 117. Notification of a reference value for DC components to be removed may be provided from the CPU 150, which will be described later. In the sound wave level signals from which DC components have been removed, sound pressure fluctuations are represented as signed numerical values. The square computation circuit 117 squares the values of the sound wave level signals input from the DC removal circuit 115, and outputs the squared signals to the interval averaging circuit 119. In the squared sound wave level signals, the magnitudes of sound pressure fluctuations are represented as positive numerical values.

The interval averaging circuit 119 calculates an interval average of the sound wave level signals input from the square computation circuit 117 for each time interval of a certain time length. A time length of each time interval may be, for example, a fixed length of 2 ms. Alternatively, for each time interval, the interval averaging circuit 119 may use a time length that varies depending on the type of detected sound. The sound wave level signals are formatted through the foregoing squaring and interval averaging, and result in chronological pieces of sound wave level data that indicate the magnitudes of sound pressure fluctuations in respective time intervals. The interval averaging circuit 119 sequentially writes the pieces of sound wave level data as the results of interval averaging into the buffer 130.

Figure 6:
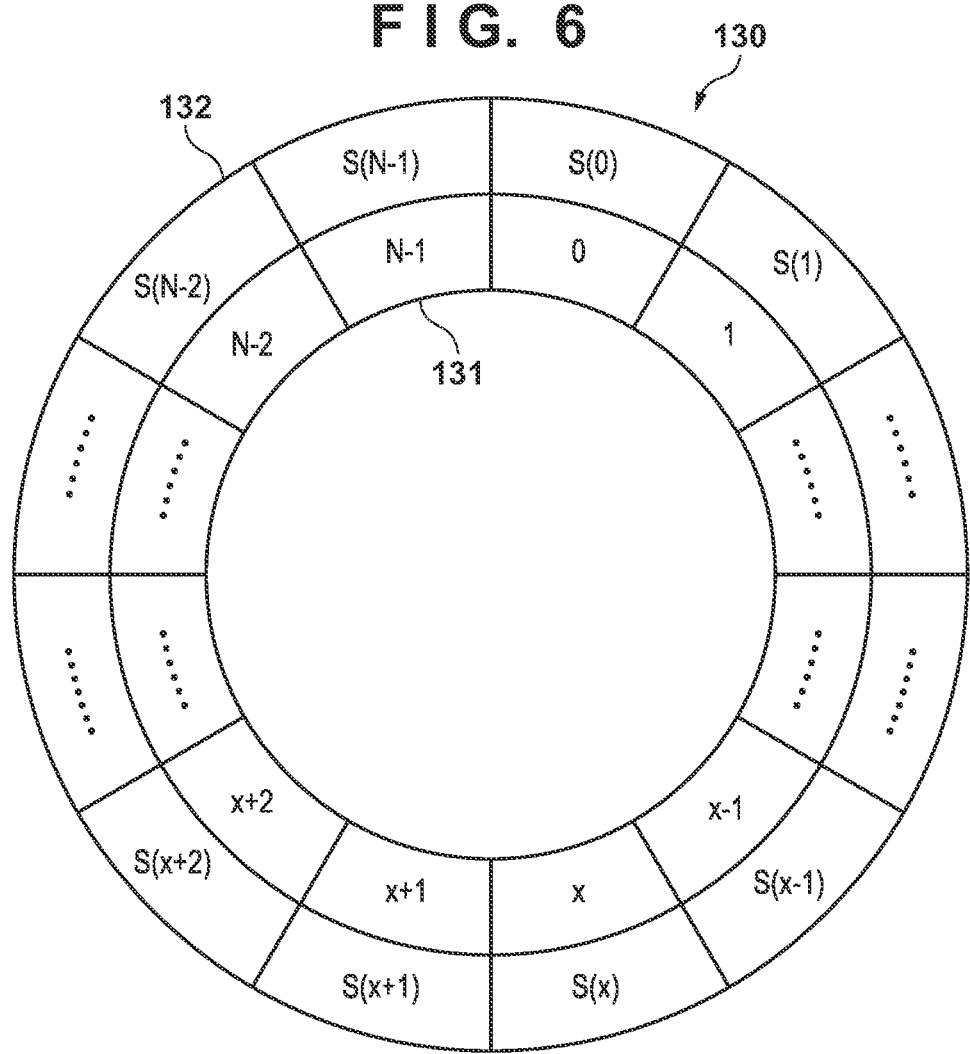
FIG. 6 is an explanatory diagram for describing an example of a configuration of a ring buffer.

The buffer 130 is a storage unit that stores the pieces of sound wave level data indicating the sound wave levels, in respective time intervals, of the sound waves obtained by the microphone 70. The buffer 130 may be, for example, a ring buffer that stores the pieces of sound wave level data in respective time intervals in a circulative manner. FIG. 6 is an explanatory diagram for describing an example of a configuration of the buffer 130, which is the ring buffer. In the example of FIG. 6, the buffer 130 includes N storage regions 132 that are respectively assigned indexes 131 from 0 to N−1. The $i^{th}$ (i=0, ... , N−1) storage region is expressed as S(i), and sound wave level data $L_k$ in the $k^{th}$ time interval is stored in the storage region S(k mod N). For example, after the interval averaging circuit 119 has written sound wave level data in a certain time interval into the $(N-1)^{th}$ storage region S(N−1), it overwrites the $0^{th}$ storage region S(0) using sound wave level data in the next time interval. In this manner, the buffer 130 always holds the latest N sound wave levels L as data.

The state notification section 140 monitors the states of one or more variable mechanisms of the image forming apparatus 1 based on state detection signals input from a state detector, such as the cassette switch 31 and the cover switch 51. When a variation in a state of a certain variable mechanism has been detected from a variation in the voltage of a state detection signal, the state notification section 140 notifies the CPU 150 of the variation in the state. The state notification section 140 may notify the CPU 150 also of information that identifies the variable mechanism whose state has varied.

The CPU 150 is a processor that executes computation required to control the functions of the image forming apparatus 1. When a variation in a state of a variable mechanism of the image forming apparatus 1 has been detected, the CPU 150 generates statistical information regarding sound waves obtained by the microphone 70 based on sound wave level data stored in the buffer 130. As an example, the CPU 150 may generate statistical information regarding sound waves based on sound wave levels in one or more time intervals that were stored into the buffer 130 before the time point when the state variation is detected, and on sound wave levels in one or more time intervals that are stored into the buffer 130 after this time point. As another example, the CPU 150 may generate statistical information regarding sound waves based on sound wave levels of sound waves obtained by the microphone 70 in one or more time intervals that are after the time point when the state variation is detected. Statistical information regarding sound waves generated by the CPU 150 can include one or more of an average value, a maximum value, and an integrated value of sound wave levels of sound waves obtained in a plurality of time intervals. Such statistical information can be used as a measure for evaluating the intensity of a force applied to a variable mechanism at the time of a user operation.

The communication interface 160 is an interface for communication between the image forming apparatus 1 and another apparatus. The communication interface 160 may be a wired interface, or may be a wireless interface. The display 165 is a device that displays information generated by the CPU 150. The screen 80 shown in FIG. 2 can be a part of the display 165.

Figure 7:
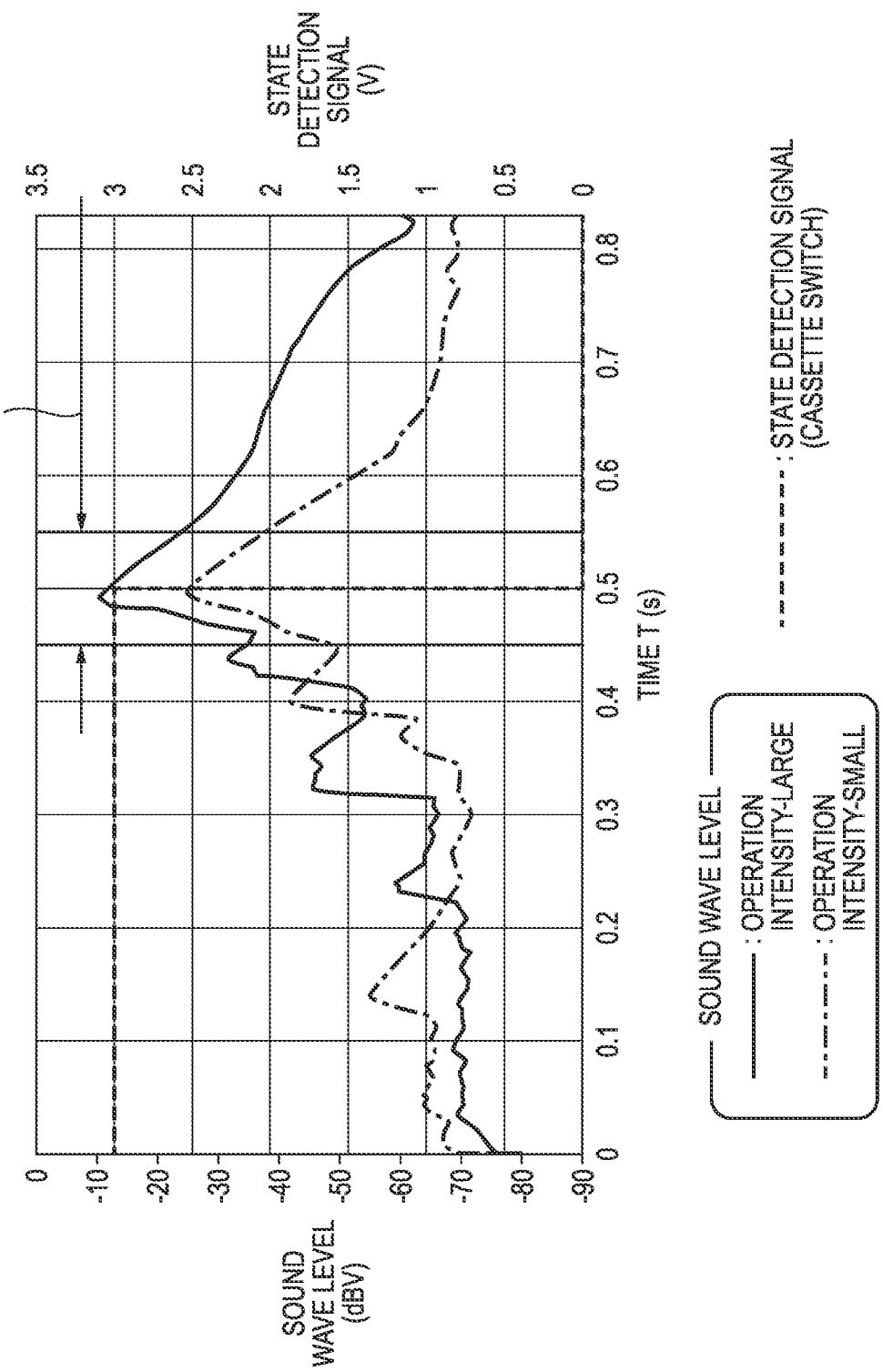
FIG. 7 is a graph chronologically showing sound wave levels of operation sound pertaining to a case where an operation of inserting the cassette tray in the main body of the apparatus is performed.

FIG. 7 is a graph chronologically showing the sound wave levels of sound waves (i.e., operation sound) that were actually obtained when an operation of inserting the cassette tray 30 in the main body of the image forming apparatus 1 was performed. The horizontal axis of the graph indicates time (s). The dash line of the graph represents signal levels (voltage values) of a state detection signal output from the cassette switch 31. As shown in the figure, a signal level of the state detection signal from the cassette switch 31 at first indicated a high level corresponding to a state where the cassette tray 30 is pulled out, but made a transition to a low level at time T=0.5. This means that the cassette tray 30 was inserted completely in the main body at time T=0.5.

The solid line of the graph of FIG. 7 represents signal levels (dBV) of sound waves obtained by the microphone 70 in a case where the cassette tray 30 was operated with a relatively strong force. The dash-and-dot line of the graph represents signal levels (dBV) of sound waves obtained by the microphone 70 in a case where the cassette tray 30 was operated with a relatively weak force. As shown in the figure, in the case where the cassette tray 30 was inserted at a high speed with a large operation intensity, the sound wave levels indicated large values, especially around T=0.5, compared to the case where the cassette tray 30 was inserted at a low speed with a small operation intensity. Therefore, it can be said that whether the user's operation on the cassette tray 30 has been appropriate can be evaluated by, for example, analyzing a statistical value, such as an average value, a maximum value, or an integrated value, of the sound wave levels throughout an interval 171 including T=0.5. In the example of FIG. 7, the interval 171 is an interval that lasts for 100 milliseconds from T=0.45 to T=0.55.

Figure 8:
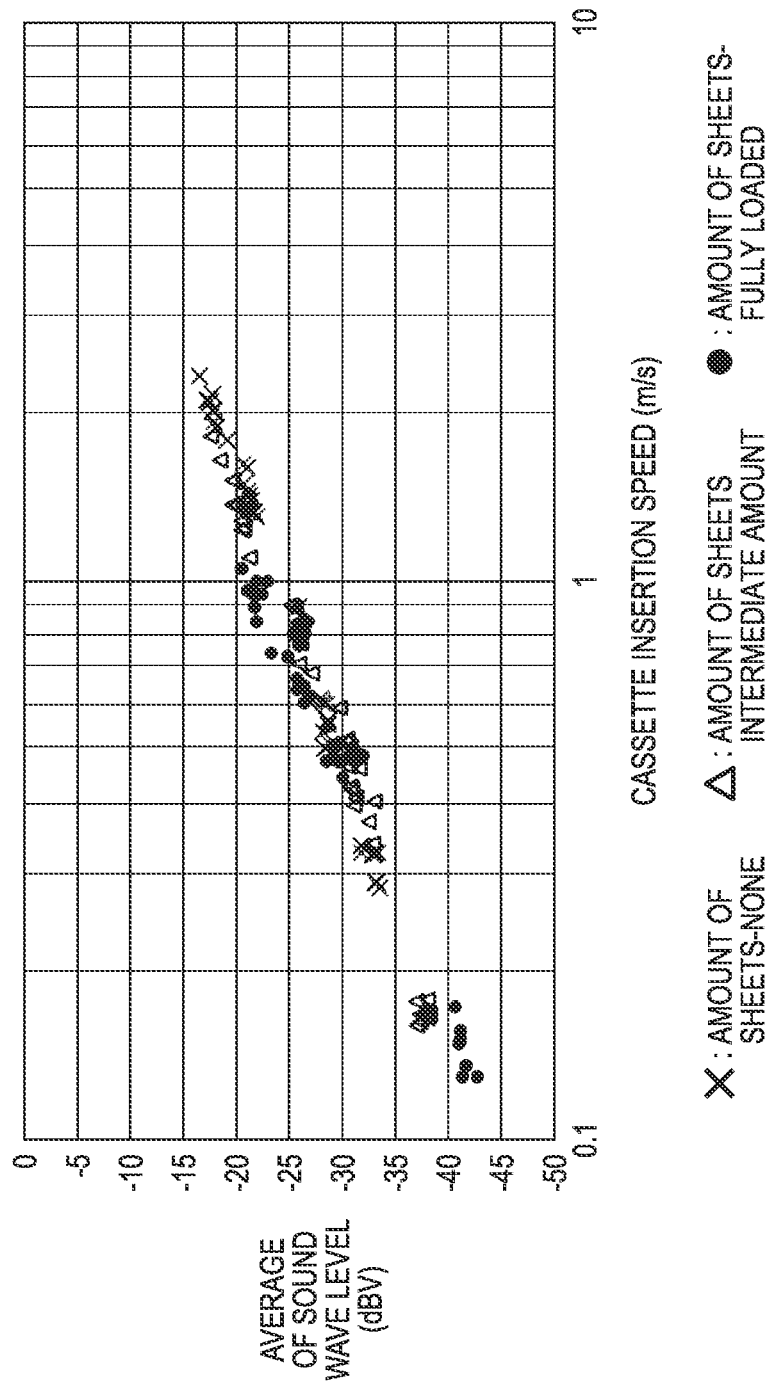
FIG. 8 is a graph showing some examples of a relationship between the speed of insertion of the cassette tray and an average sound wave level of operation sound.

FIG. 8 is a graph showing a relationship between the speed (m/s) of insertion of the cassette tray 30 and an average sound wave level (dBV) of operation sound, for each of three patterns of amounts of sheets accommodated in the cassette tray 30. In the graph, the horizontal axis indicates a cassette insertion speed (m/s), and the vertical axis indicates an average sound wave level (dBV). The cross marks plotted in the graph represent actual measured values in a state where the cassette tray 30 accommodates no sheet, the triangle marks represent actual measured values in a state where the cassette tray 30 accommodates an intermediate amount of sheets, and the solid circles represent actual measured values in a state where the cassette tray 30 accommodates a full load of sheets. As can be understood from FIG. 8, the average of sound wave levels that accompany the insertion of the cassette tray 30 is proportional to the cassette insertion speed, and is hardly dependent on the amount of sheets accommodated in the cassette tray 30. Therefore, based on statistical information regarding operation sound produced when the cassette tray 30 is operated, the values of measures such as a speed and acceleration of the cassette tray 30 and a force applied to the cassette tray 30 during the operation can be estimated.

Figure 9:
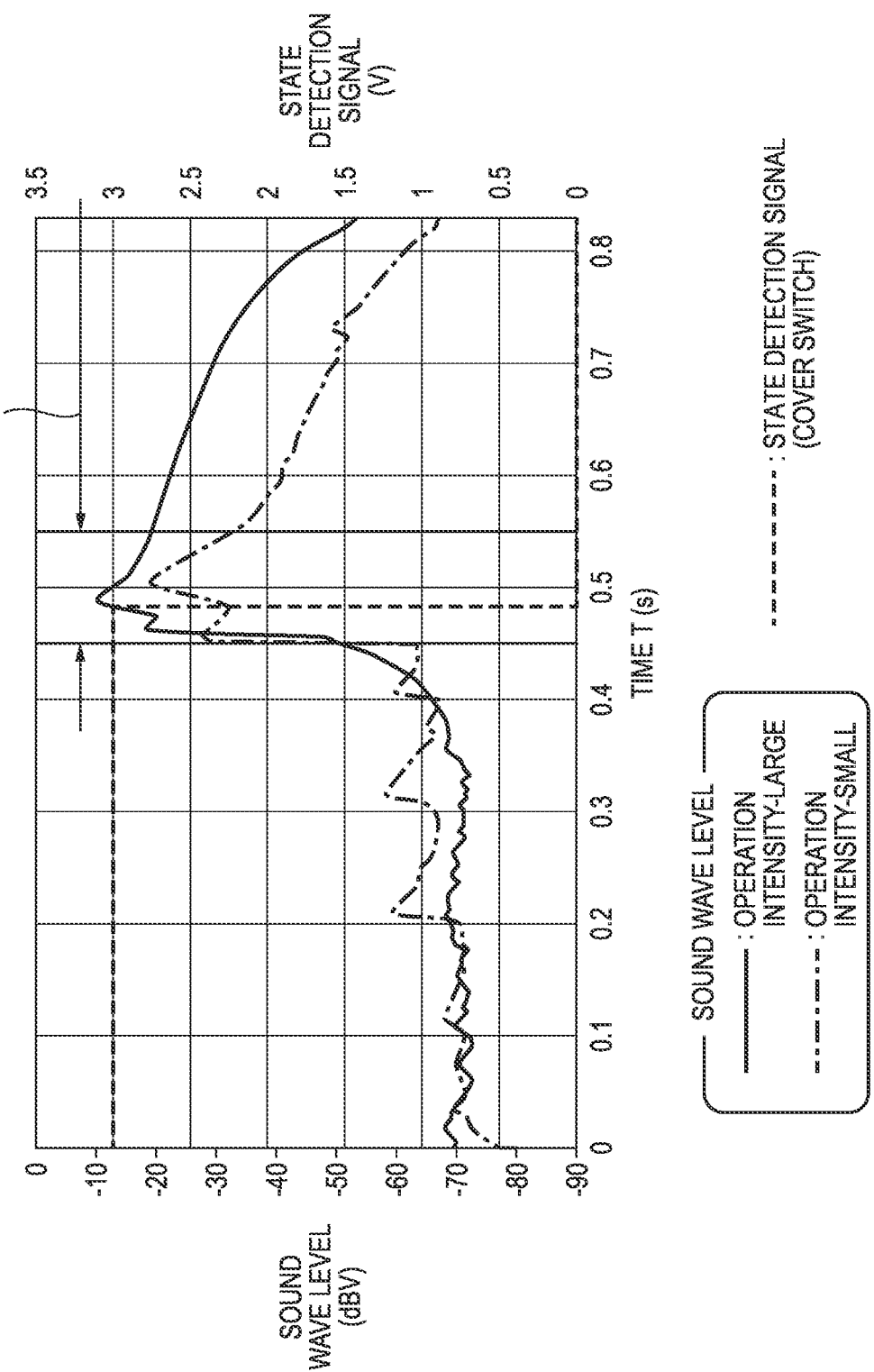
FIG. 9 is a graph chronologically showing sound wave levels of operation sound pertaining to a case where an operation of closing the cover is performed.

FIG. 9 is a graph chronologically showing the sound wave levels of sound waves (i.e., operation sound) that were actually obtained when an operation of closing the front cover 50 was performed. The horizontal axis of the graph indicates time (s). The dash line of the graph represents signal levels (voltage values) of a state detection signal output from the cover switch 51. As shown in the figure, a signal level of the state detection signal from the cover switch 51 at first indicated a high level corresponding to a state where the front cover 50 is open, but made a transition to a low level at time T=0.48. This means that the front cover 50 was completely closed at time T=0.48.

The solid line of the graph of FIG. 9 represents signal levels (dBV) of sound waves obtained by the microphone 70 in a case where the front cover 50 was operated with a relatively strong force. The dash-and-dot line of the graph represents signal levels (dBV) of sound waves obtained by the microphone 70 in a case where the front cover 50 was operated with a relatively weak force. As shown in the figure, in the case where the front cover 50 was closed at a high speed with a large operation intensity, the sound wave levels indicate large values, especially around T=0.48, compared to the case where the front cover 50 was closed at a low speed with a small operation intensity. Therefore, it can be said that whether the user's operation on the front cover 50 has been appropriate can be evaluated by, for example, analyzing a statistical value, such as an average value, a maximum value, or an integrated value, of the sound wave levels throughout an interval 172 including T=0.48. In the example of FIG. 9, the interval 172 is an interval that lasts for 100 milliseconds from T=0.45 to T=0.55.

Figure 10:
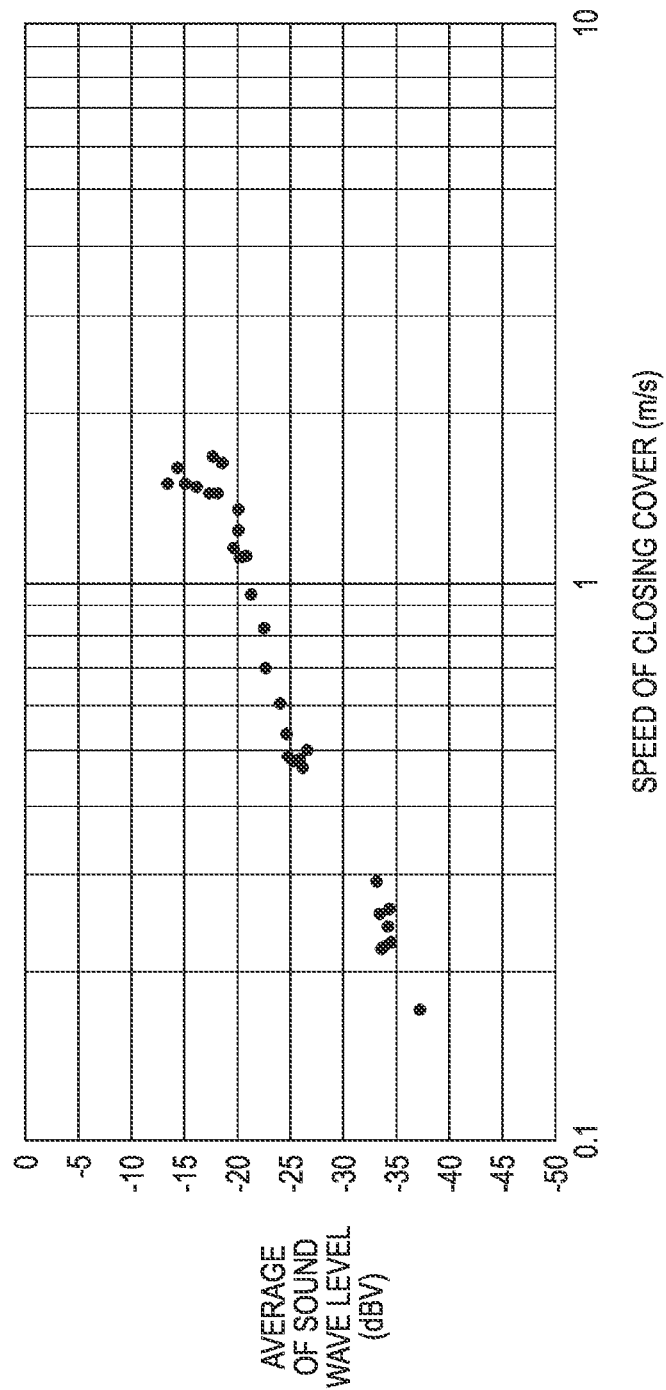
FIG. 10 is a graph showing an example of a relationship between the speed of closing the cover and an average sound wave level of operation sound.

FIG. 10 is a graph showing an example of a relationship between the speed (m/s) of closing the front cover 50 and an average sound wave level (dBV) of operation sound. In the graph, the horizontal axis indicates the speed (m/s) of closing the cover, and the vertical axis indicates an average sound wave level (dBV). The solid circles plotted in the graph represent actual measured values of the average sound wave level. As can be understood from FIG. 10, the average of sound wave levels that accompany the operation of closing the front cover 50 is substantially proportional to the speed of this operation. Therefore, based on statistical information regarding operation sound produced when the front cover 50 is operated, the values of measures such as a speed and acceleration of the front cover 50 and a force applied to the front cover 50 during the operation can be estimated.

As has been described using FIG. 7 to FIG. 10, statistical information regarding sound waves that are obtained when a variable mechanism of the image forming apparatus 1 is operated, especially when a variation in a state of the variable mechanism is detected, is beneficial in evaluating the appropriateness of a user operation. For example, when the force applied to the variable mechanism at the time of the user operation is evaluated to be too strong, it is possible to prompt the user to operate the variable mechanism with a smaller force in subsequent operations by issuing a warning to the user. Taking such a measure reduces the risks of abnormalities in the image forming apparatus 1, such as failures and poor quality. Poor quality mentioned here can include, for example, a decrease in the printing accuracy caused by a positional displacement of recording mediums 2 inside the cassette tray 30. Furthermore, accumulating statistical information regarding sound waves as a history in a storage located inside or outside the image forming apparatus 1 facilitates post-hoc specification of the cause of an abnormality when the abnormality has occurred.

The CPU 150 may associate identification information that identifies a variable mechanism whose state has varied with statistical information regarding sound waves that were generated in the event of this variation. For example, the CPU 150 associates first identification information that identifies the cassette tray 30 with first statistical information that was generated in the event of a variation in a state detected by the cassette switch 31. Furthermore, the CPU 150 associates second identification information that identifies the front cover 50 with second statistical information that was generated in the event of a variation in a state detected by the cover switch 51. By thus associating identification information that identifies a variable mechanism with statistical information regarding sound waves, evaluation of the appropriateness of a user operation or evaluation of the risks of abnormalities based on statistical information can be performed separately for each variable mechanism. Evaluations based on statistical information, or accumulation of statistical information, may be performed in the image forming apparatus 1, or may be performed in an apparatus that is different from the image forming apparatus 1. In the latter case, statistical information can be transmitted to another apparatus via, for example, the communication interface 160. Evaluation based on statistical information may be artificially performed by the user. In this case, statistical information generated by the CPU 150 can be displayed on, for example, the screen 80 of the display 165.

In the foregoing, the cassette tray 30 and the front cover 50 have been mainly described as variable mechanisms of the image forming apparatus 1. However, the foregoing mechanism is also applicable to other user operations involving a state where the cartridges 20 are attached/removed, a state where the fixing unit 40 is attached/removed, a state of another member included in the main body (e.g., opening/closing of the right cover 48), and so forth. Furthermore, the foregoing mechanism is also applicable to operation directions that are opposite to the directions according to the described examples (e.g., an operation of pulling out the cassette tray 30, and an operation of opening the front cover 50).

4. Flow of Processing

The present section describes some examples of a flow of processing executed by the image forming apparatus 1 according to the above-described embodiment. In a first working example, the image forming apparatus 1 generates statistical information regarding sound waves based on sound wave levels in N time intervals, including a time interval before the time point when a variation in a state of a variable mechanism is detected and a time interval after this time point. As an example, this statistical information can be an average value of sound wave levels throughout the N intervals. In a second working example, the image forming apparatus 1 generates statistical information regarding sound waves based on sound wave levels in N time intervals after the time point when a variation in a state of a variable mechanism is detected. As an example, this statistical information can be a maximum value of N sound wave levels.

(1) First Working Example

Figure 11:
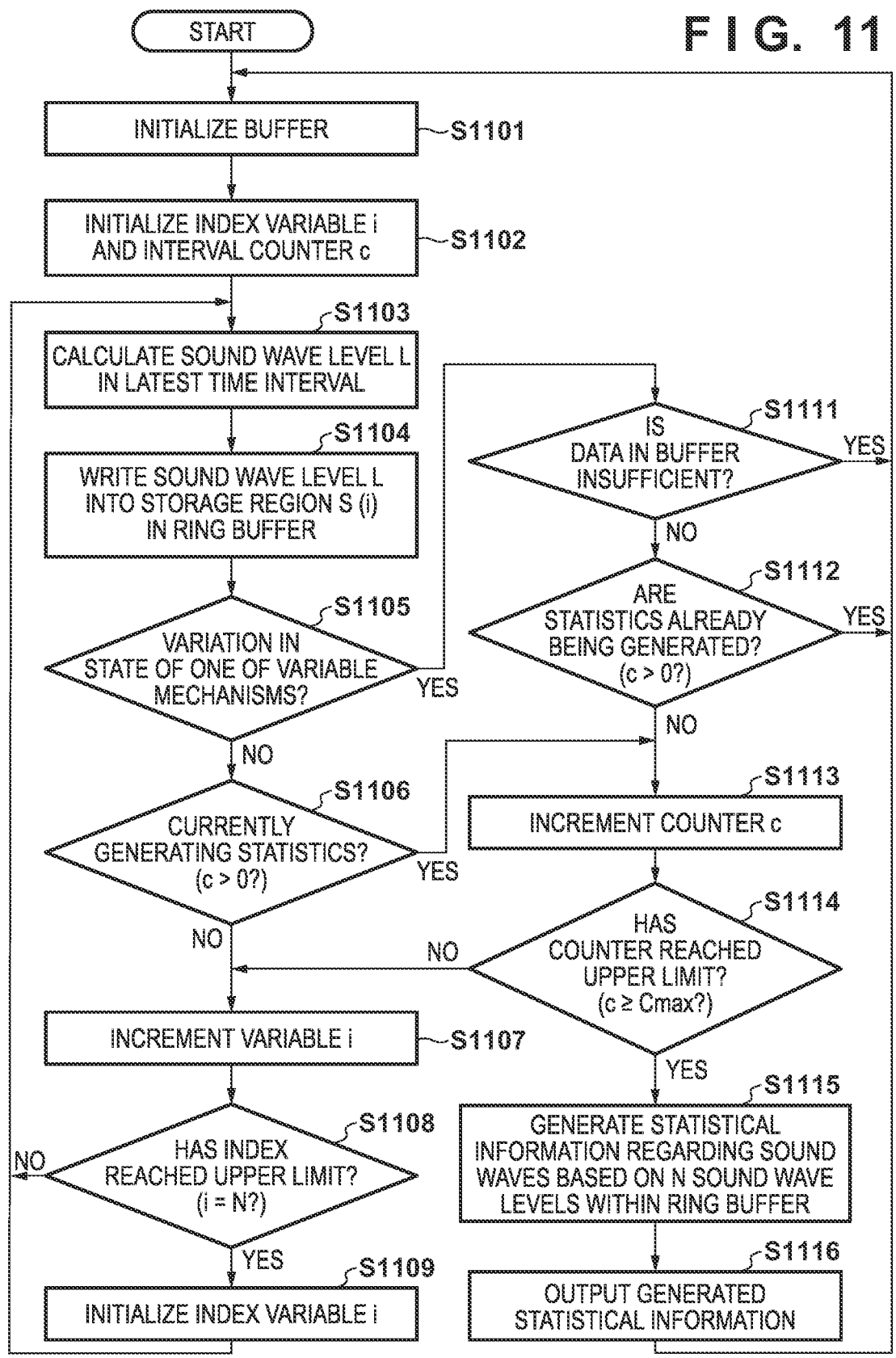
FIG. 11 is a flowchart showing an example of a flow of statistic generation processing executed by the image forming apparatus according to an embodiment.

FIG. 11 is a flowchart showing an example of a flow of statistic generation processing executed by the image forming apparatus 1 in the first working example. The statistic generation processing shown in FIG. 11 can be realized by, for example, a combination of hardware, such as the sound processing circuit 110, included in the controller 100 and software (a computer program) executed by the CPU 150. The computer program can be, for example, loaded to a memory, which is not shown in FIG. 5, and executed by the CPU 150. Note that in the following description, processing steps are abbreviated as S (steps).

First, in step S1101, the CPU 150 initializes the N storage regions in the buffer 130. Next, in step S1102, the CPU 150 initializes both of an index variable i and an interval counter c to zero. The index variable i is a variable for referring to the storage regions in the buffer 130 in a circulative manner. The interval counter c is a variable for counting time intervals in generating statistical information.

In step S1103, the sound processing circuit 110 calculates a sound wave level L of a sound wave obtained by the microphone 70 in the latest time interval through processing of, for example, signal amplification, AD conversion, removal of DC components, square computation, and interval averaging. In step S1104, the interval averaging circuit 119 of the sound processing circuit 110 writes the calculated sound wave level L into the storage region S(i) in the buffer 130, which is the ring buffer.

Thereafter, processing branches off depending on whether the state notification section 140 has detected a variation in a state of one of the variable mechanisms in step S1105. When a variation in a state of a variable mechanism has been detected, processing proceeds to step S1111. When a variation has not been detected, processing proceeds to step S1106.

When a variation in a state of a variable mechanism has not been detected, processing further branches off depending on whether the CPU 150 is currently generating statistical information regarding sound waves in step S1106. For example, when the interval counter c is equal to zero, the generation of statistical information has not been started yet, and thus processing proceeds to step S1107. On the other hand, when c is larger than zero, the CPU 150 is currently generating statistical information, and thus processing proceeds to step S1113.

In step S1107, the CPU 150 increments the index variable i. Next, in step S1108, the CPU 150 determines whether the index for referring to the buffer has reached its upper limit, that is to say, whether i=N. When i has reached N, the index variable i is initialized to zero for a circulative reference to the buffer in step S1109. When i has not reached N, step S1109 is skipped. Thereafter, processing returns to step S1103.

When the state notification section 140 has detected a variation in a state of a variable mechanism in step S1105, the CPU 150 determines whether the amount of sound wave level data inside the buffer 130 is insufficient for generating statistical information in step S1111. For example, assume that the generation of statistical information requires pieces of sound wave level data in a total of N time intervals, and in $C_{max}$ time intervals after the detection of the state variation; in this case, when the interval counter c has not reached $N-C_{max}$ after the initialization in step S1102, it can be determined that data is insufficient. When data inside the buffer is insufficient, statistical information is not generated, and processing returns to step S1101. When data inside the buffer is not insufficient, processing proceeds to step S1112.

When data inside the buffer is not insufficient, the CPU 150 determines whether statistical information is currently generated at that point in step S1112. For example, when the interval counter c is equal to zero, the generation of statistical information has not been started yet, and thus processing proceeds to step S1113. On the other hand, when c is larger than zero, it is construed that a new state variation has been detected while the CPU 150 is currently generating statistical information with respect to a previous state variation. In this case, as it is difficult to generate significant statistical information, the generation of statistical information is cancelled, and processing returns to step S1101.

In step S1113, the CPU 150 increments the interval counter c. Next, the CPU 150 determines whether the interval counter c has reached its upper limit in step S1114. For example, when $c \geq C_{max}$, the interval counter c has reached its upper limit, and thus processing proceeds to step S1115. On the other hand, when $c < C_{max}$, the interval counter c has not reached its upper limit, and thus processing proceeds to step S1107, and the calculation of a sound wave level L in the latest time interval, as well as circulative writing of L into the ring buffer, is advanced.

When the interval counter c has reached its upper limit, the CPU 150 generates statistical information regarding sound waves based on N sound wave levels that have been respectively written into the N storage regions in the buffer 130 in step S1115. For example, the CPU 150 can calculate an average value of the N sound wave levels as statistical information. The CPU 150 may further associate, with the generated statistical information, identification information which identifies the variable mechanism whose state has varied and which is provided as a notification from the state notification section 140. Then, the CPU 150 outputs the generated statistical information to a storage so that the generated statistical information is stored in the storage, transmits the generated statistical information to another apparatus via the communication interface 160, or outputs the generated statistical information to the display 165 so that the generated statistical information is displayed on the screen 80. For example, when the generated statistical information satisfies a predetermined warning condition, the CPU 150 may output, to the display 165, a warning message that prompts the user to operate the variable mechanism with a smaller force in subsequent operations, and display the warning message on the screen 80. The warning condition may be, for example, a state where the average value of the sound wave levels (or another measure described later) exceeds a threshold, or a state where the threshold has been exceeded a predetermined number of times. Instead of displaying the warning message, a warning to the user may be issued using other means of warning, such as outputting of warning sound or warning voice, or lighting of a light emission unit (e.g., an LED).

Although not shown in FIG. 11, the CPU 150 may further estimate another measure for evaluating the intensity of a force applied to the variable mechanism by substituting the average value of the sound wave levels calculated in step S1115 in a pre-defined calculation formula. Another measure mentioned here can be, for example, the speed or acceleration of the operation or the intensity of the force. The calculation formula can be defined as, for example, a function that fits the distribution of actual measured values that have been described using FIG. 8 and FIG. 10. Such another measure can also be included in the output statistical information.

Thereafter, the statistic generation processing shown in FIG. 11 returns to step S1101, and the calculation of a sound wave level L, writing of the sound wave level L into the buffer, and monitoring of a state variation of a variable mechanism are continued.

In the first working example, as statistical information is generated based on sound wave levels in time intervals before and after the time point when a state variation of a variable mechanism is detected, a user operation can be evaluated more appropriately based on operation sound compared to the second working example, which will be described later.

Note that as a special case of the first working example, when zero is set as $C_{max}$, statistical information regarding sound waves can be generated based on sound wave levels in N time intervals before the time point when a variation in a state of a variable mechanism is detected. Parameters that control the number of time intervals, such as N and $C_{max}$, may be defined as fixed parameters in advance, or may be changeable by an administrator.

(2) Second Working Example

Figure 12:
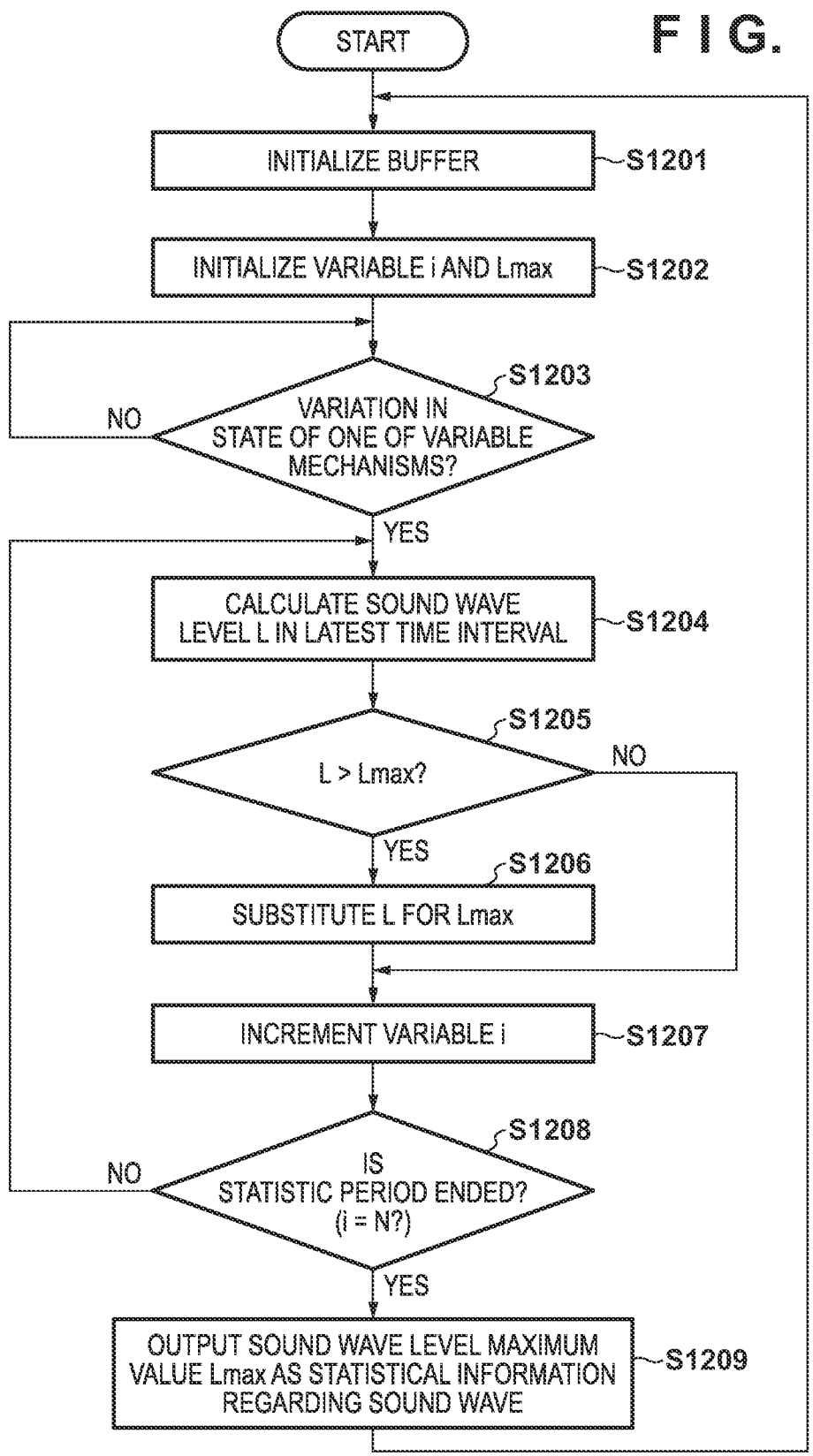
FIG. 12 is a flowchart showing another example of a flow of statistic generation processing executed by the image forming apparatus according to an embodiment.

FIG. 12 is a flowchart showing an example of a flow of statistic generation processing executed by the image forming apparatus 1 in the second working example. The statistic generation processing shown in FIG. 12 can be realized by, for example, a combination of hardware, such as the sound processing circuit 110, included in the controller 100 and software (a computer program) executed by the CPU 150. The computer program can be, for example, loaded to a memory, which is not shown in FIG. 5, and executed by the CPU 150.

First, in step S1201, the CPU 150 initializes the N storage regions in the buffer 130. Next, in step S1202, the CPU 150 initializes the variables i and $L_{max}$ to zero. The variable i is a variable for sequentially referring to the storage regions in the buffer 130. The variable $L_{max}$ is a variable for storing a maximum value of sound wave levels.

In step S1203, the CPU 150 stands by until the state notification section 140 detects a variation in a state of one of the variable mechanisms. When a variation in a state of a variable mechanism has been detected, processing proceeds to step S1204.

In step S1204, the sound processing circuit 110 calculates a sound wave level L of a sound wave obtained by the microphone 70 in the latest time interval through processing of, for example, signal amplification, AD conversion, removal of DC components, square computation, and interval averaging. The interval averaging circuit 119 of the sound processing circuit 110 writes the calculated sound wave level L into the storage region S(i) in the buffer 130.

Next, in step S1205, the CPU 150 determines whether the sound wave level L calculated in step S1204 exceeds $L_{max}$. When L exceeds $L_{max}$, the CPU 150 updates a maximum value of sound wave levels by substituting L for $L_{max}$ in step S1206. Next, in step S1207, the CPU 150 increments the variable i. Next, in step S1208, the CPU 150 determines whether a statistic period corresponding to N time intervals has ended. For example, when i has reached N, the statistic period has ended, and thus processing proceeds to step S1209. On the other hand, when i has not reached N, the statistic period has not ended, and thus the aforementioned steps S1204 to S1207 are repeated with respect to the next time interval.

When processing proceeds to step S1209, the value of $L_{max}$ at that point indicates a maximum value of N sound wave levels that were calculated during a statistic period that follows the time point when the state variation of the variable mechanism is detected. In step S1209, the CPU 150 outputs this maximum value $L_{max}$ as statistical information regarding sound waves to a storage, the communication interface 160, or the display 165.

In the present working example, too, the CPU 150 may further estimate another measure for evaluating the intensity of a force applied to a variable mechanism by substituting a maximum value $L_{max}$ in a pre-defined calculation formula, and include such another measure that has been estimated in statistical information. Furthermore, the CPU 150 may associate identification information that identifies a variable mechanism whose state has varied with output statistical information.

Thereafter, the statistic generation processing shown in FIG. 12 returns to step S1201, and monitoring of a state variation of a variable mechanism is resumed.

Comparing the second working example with the first working example, the second working example has no need to constantly perform repetitive calculation of a sound wave level L and store the same to the buffer, and thus can reduce a load on resources for computation and storage purposes in the image forming apparatus 1.

5. Implementation as Image Forming System

The foregoing has described an example in which both of the function of calculating the sound wave levels in respective time intervals from sound level signals, and the function of generating statistical information regarding sound waves, are implemented on the image forming apparatus 1. However, a part of these functions (e.g., signal processing and statistical computation in a digital domain) may be implemented on another apparatus that is connected to the image forming apparatus 1 via a network. That is to say, the technique according to the present disclosure is generally applicable to an image forming system. An image forming system mentioned here can mean both of a single image forming apparatus and a plurality of apparatuses that are coordinated with one another (at least one of them is an image forming apparatus). Another apparatus that is coordinated with an image forming apparatus may be, for example, a server apparatus within a service center that manages the states of a plurality of image forming apparatuses. One or more of the function of calculating sound wave levels, the function of generating statistical information regarding sound waves, the function of presenting the statistical information to an administrator, the function of providing the statistical information to an original image forming apparatus, and the function of evaluating a user operation by analyzing the statistical information, may be implemented on the foregoing another apparatus.

6. Summary

Thus far, the embodiment of the present disclosure has been described in detail using FIG. 1 to FIG. 12. In the above-described embodiment, when the image forming apparatus has detected a variation of a state of a variable mechanism that is physically operated by a user, statistical information regarding at least one sound wave obtained by a sound collection unit in a period based on a timing when the variation has been detected is generated. This configuration enables evaluation of the risks of abnormalities in the image forming apparatus, such as failures and poor quality, with use of statistical information based on sound caused a user operation.

Furthermore, in the above-described embodiment, based on sound wave levels of sound waves obtained in one or more time intervals corresponding to the time point when the variation is detected, the statistical information may be generated as, for example, an average value, a maximum value, or an integrated value of the sound wave levels. As these statistical values have correlations with the intensity of a force that is applied to the variable mechanism at the time of the user operation, whether the user operation has been appropriate can be evaluated in a simple manner by analyzing the statistical information. For example, in a case where the force applied to the variable mechanism at the time of the user operation is evaluated to be too strong, it is possible to prompt the user to operate the variable mechanism with a smaller force in subsequent operations by issuing a warning to the user. Taking such a measure reduces the risks of abnormalities in the apparatus, such as failures and poor quality.

Furthermore, in the above-described embodiment, the statistical information may be generated in association with identification information that identifies the variable mechanism for which a state variation has been detected. In this case, when the statistical information is analyzed, it is possible to unambiguously specify on which one of a plurality of variable functions that can be included in the image forming apparatus the operation in question was performed.

Furthermore, in the above-described embodiment, the statistical information may be transmitted to another apparatus via a communication interface. In this case, whether the user operation has been appropriate can be evaluated by analyzing the statistical information on such another apparatus (e.g., an apparatus within a service center).

Furthermore, in the above-described embodiment, the statistical information may be displayed on a display of the image forming apparatus. In this case, notification of whether the user operation has been appropriate can be provided, via a screen, directly to the user who has operated the image forming apparatus (or another user, such as an administrator).

The above-described embodiment has mainly described an example in which the technique according to the present disclosure is applied to an image forming apparatus. However, the above-described structure for outputting statistical information regarding sound waves is also applicable to other types of image processing apparatuses, such as a scanner and a facsimile device.

7. Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of priority from Japanese Patent Application No. 2020-013813, filed on Jan. 30, 2020 which is hereby incorporated by reference herein in its entirety.

What is claimed is:

1. An image forming system comprising:
    an image forming apparatus including:
        a variable mechanism configured to vary, when physically operated by a user, from a first state to a second state or from the second state to the first state,
        a detection sensor configured to detect the variation of a state of the variable mechanism, and
        a microphone configured to obtain a sound wave generated inside of the image forming apparatus;
    a controller configured to generate, when the variation is detected by the detection sensor, statistical information regarding at least one sound wave obtained by the microphone in a period based on a timing when the variation is detected by the detection sensor; and
    a warning unit configured to issue a warning based on the statistical information generated by the controller.

2. The image forming system according to claim 1, wherein the controller is configured to generate the statistical information based on a sound wave level of a sound wave obtained by the microphone in one or more time intervals before the timing when the variation is detected and a sound wave level of a sound wave obtained by the microphone in one or more time intervals after the timing when the variation is detected.

3. The image forming system according to claim 1, wherein the controller is configured to generate the statistical information based on a sound wave level of a sound wave obtained by the microphone in one or more time intervals after the timing when the variation is detected.

4. The image forming system according to claim 1, wherein the statistical information includes one or more of an average value, a maximum value, and an integrated value of sound wave levels of sound waves obtained in a plurality of time intervals.

5. The image forming system according to claim 1, wherein the statistical information is utilized as a measure for evaluating an intensity of a force applied to the variable mechanism at the time of the user operation.

6. The image forming system according to claim 1, wherein the controller is configured to associate, with the statistical information, identification information that identifies the variable mechanism.

7. The image forming system according to claim 1, wherein the image forming apparatus further includes a communication unit configured to transmit the statistical information generated by the controller to another apparatus.

8. The image forming system according to claim 1, wherein the warning unit includes a display configured to display the warning regarding the variable mechanism on a screen.

9. The image forming system according to claim 1, wherein the variable mechanism is a first variable mechanism, the detection sensor is a first detection sensor, the statistical information is first statistical information, and the warning is a first warning, wherein the image forming apparatus further includes:

a second variable mechanism configured to vary, when physically operated by the user, from a third state to a fourth state or from the fourth state to the third state, and a second detection sensor configured to detect the variation of a state of the second variable mechanism, wherein the controller is configured to, when the variation is detected by the second detection sensor, generate second statistical information regarding at least one sound wave obtained by the microphone in a period based on a timing when the variation is detected by the second detection sensor, and wherein the warning unit is configured to issue a second warning based on the second statistical information generated by the controller.

10. The image forming system according to claim 1, wherein the variable mechanism includes a cover that is mounted, in an openable and closable manner, on a main body of the image forming apparatus, wherein the first state is a state where the cover is open, and wherein the second state is a state where the cover is closed.

11. The image forming system according to claim 1, wherein the variable mechanism includes a tray that accommodates a recording medium supplied to the image forming apparatus, wherein the first state is a state where the tray is pulled out from a main body of the image forming apparatus, and wherein the second state is a state where the tray is inserted in the main body of the image forming apparatus.

12. The image forming system according to claim 1, wherein the variable mechanism includes a cartridge for forming an image on a recording medium, wherein the first state is a state where the cartridge is removed from a main body of the image forming apparatus, and wherein the second state is a state where the cartridge is attached to the main body of the image forming apparatus.

13. The image forming system according to claim 1, wherein the variable mechanism includes a fixing unit for fixing an image on a recording medium, wherein the first state is a state where the fixing unit is removed from a main body of the image forming apparatus, and wherein the second state is a state where the fixing unit is attached to the main body of the image forming apparatus.

14. The image forming system according to claim 1, wherein the image forming apparatus includes the controller and the warning unit.

15. The image forming system according to claim 1, further comprising a server apparatus connected to the image forming apparatus via a network, wherein the server apparatus includes the controller and the image forming apparatus includes the warning unit.

16. The image forming system according to claim 1, wherein the period includes a predetermined time interval before the timing when the variation is detected by the detection sensor and a predetermined time interval after the timing.

17. An image forming system comprising:

an image forming apparatus including:

a variable mechanism configured to vary, when physically operated by a user, from a first state to a second state or from the second state to the first state, a detection sensor configured to detect the variation of a state of the variable mechanism, and a microphone configured to obtain a sound wave generated inside of the image forming apparatus;

a controller configured to, when the variation is detected by the detection sensor, determine whether a sound wave level of a sound wave obtained by the microphone exceeds a threshold in a period based on a timing when the variation is detected by the detection sensor; and a warning unit configured to issue a warning when the controller determines that the sound wave level exceeds the threshold.

18. The image forming system according to claim 17, wherein the variable mechanism includes a cover that is mounted in an openable and closable manner on a main body of the image forming apparatus, wherein the first state is a state where the cover is open, and wherein the second state is a state where the cover is closed.

19. The image forming system according to claim 17, wherein the variable mechanism includes a tray that contains a recording medium supplied to the image forming apparatus, wherein the first state is a state where the tray is pulled out from a main body of the image forming apparatus, and wherein the second state is a state where the tray is inserted in the main body of the image forming apparatus.

20. The image forming system according to claim 17, wherein the variable mechanism includes a cartridge for forming an image on a recording medium, wherein the first state is a state where the cartridge is removed from a main body of the image forming apparatus, and wherein the second state is a state where the cartridge is attached to the main body of the image forming apparatus.

21. The image forming system according to claim 17, wherein the variable mechanism includes a fixing unit for fixing an image on a recording medium, wherein the first state is a state where the fixing unit is removed from a main body of the image forming apparatus, and wherein the second state is a state where the fixing unit is attached to the main body of the image forming apparatus.

22. The image forming system according to claim 17, wherein the warning unit includes a display configured to display the warning regarding the variable mechanism on a screen.

23. The image forming system according to claim 17, wherein the image forming apparatus includes the controller and the warning unit.

24. The image forming system according to claim 17, further comprising a server apparatus connected with the image forming apparatus via a network, wherein the server apparatus includes the controller and the image forming apparatus includes the warning unit.

25. The image forming system according to claim 17, wherein the period includes a predetermined time interval before the timing when the variation is detected by the detection sensor and a predetermined time interval after the timing.

* * * * *